(12) United States Patent
Wang et al.

(10) Patent No.: US 6,536,819 B2
(45) Date of Patent: Mar. 25, 2003

(54) TONGS WITH CLAMP AND STOP MEANS

(75) Inventors: Nigel Wang, Taipei (TW); Alison A. Roach, Schaumburg, IL (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 09/795,695

(22) Filed: Feb. 28, 2001

(65) Prior Publication Data

US 2002/0117869 A1 Aug. 29, 2002

(51) Int. Cl.[7] ............................. A47G 21/10; A47J 43/28
(52) U.S. Cl. ........................ 294/16; 294/99.2; 294/106
(58) Field of Search ............................ 294/3, 8.5, 11, 294/16, 28, 33, 99.2, 100, 106

(56) References Cited

U.S. PATENT DOCUMENTS

| | | | | |
|---|---|---|---|---|
| 389,925 A | * | 9/1888 | Griscom | 27/18 |
| D138,917 S | * | 9/1944 | Frank | 294/99.2 |
| 2,864,645 A | * | 12/1958 | Meldrum | 294/106 |
| 4,964,663 A | * | 10/1990 | Jermyn | 294/1.2 |
| 5,199,756 A | * | 4/1993 | Bartlett et al. | 294/106 |
| 5,934,721 A | * | 8/1999 | Walde | 294/3 |
| 6,056,338 A | * | 5/2000 | Kerr | 294/106 |
| 6,089,631 A | * | 7/2000 | Thurlow et al. | 294/16 |
| 6,092,847 A | * | 7/2000 | Kwan | 294/106 |

* cited by examiner

Primary Examiner—Dean J. Kramer
(74) Attorney, Agent, or Firm—Altheimer & Gray

(57) ABSTRACT

A barbecue tongs is provided wherein the arms are yieldingly outwardly biased. The tongs incorporate an arm pivot limiter for each of outward pivotal movement and inward pivotal movement as well as an arm lock that holds the arms in an almost fully jaws closed configuration for convenient storage. The tongs utilize a slidable U-shaped sleeve at the rear end which can have either one of two positions selected by a user. In one position, the arm lock is operational while in the second position the outward pivot limiter is operational.

9 Claims, 3 Drawing Sheets

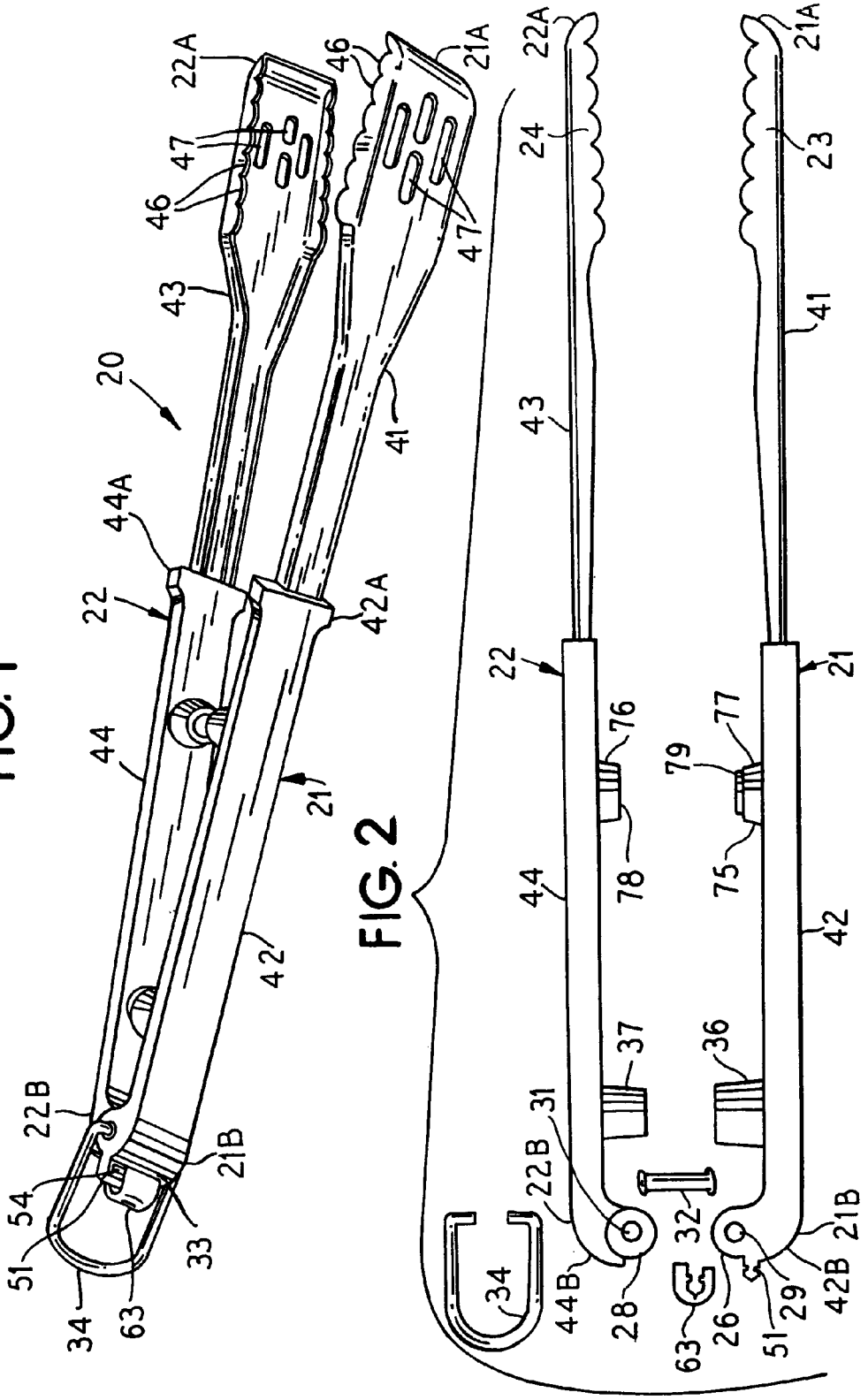

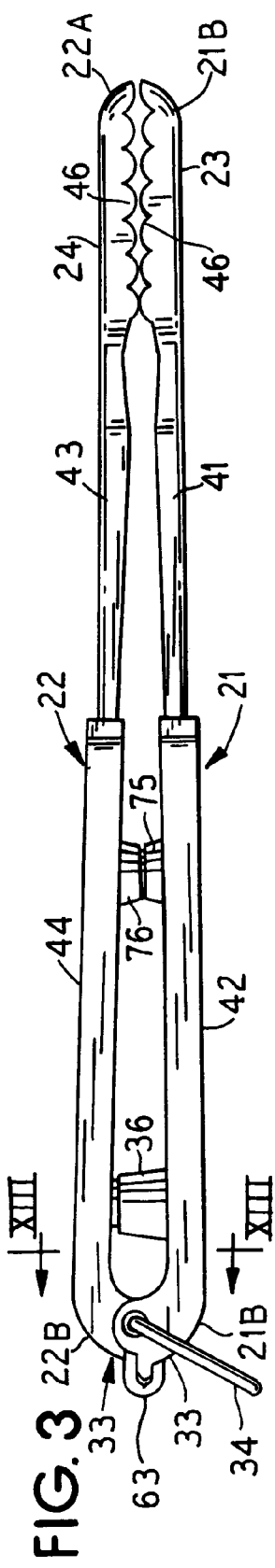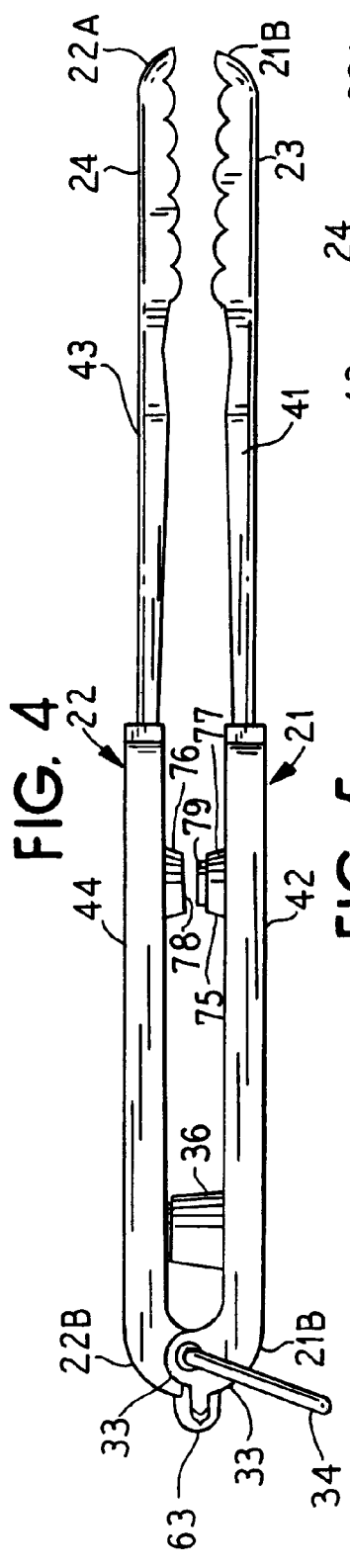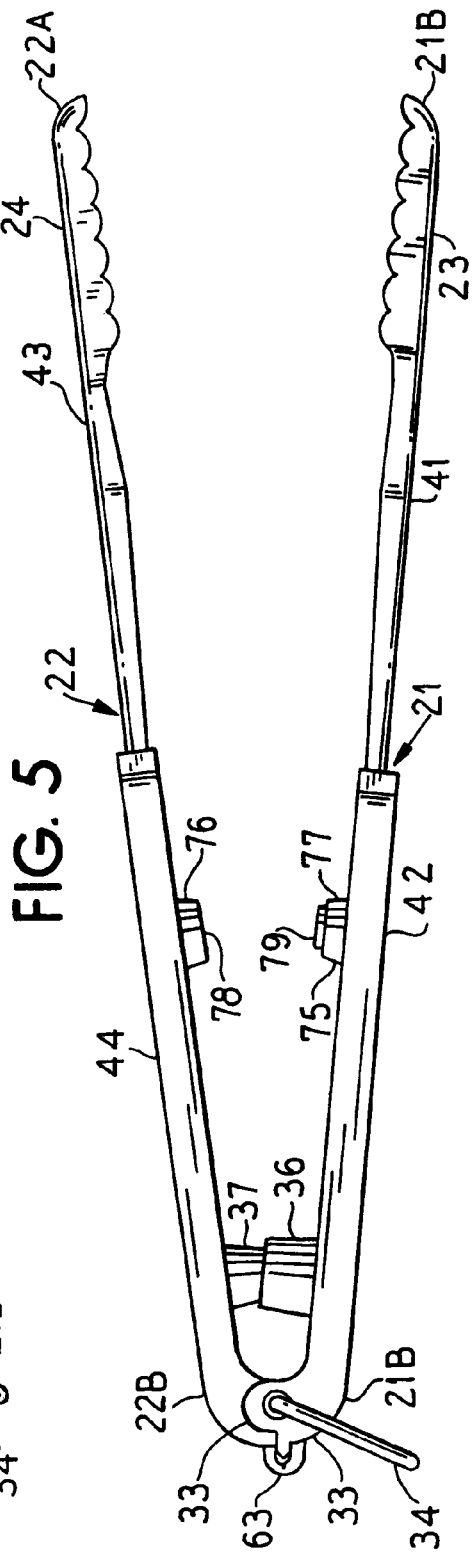

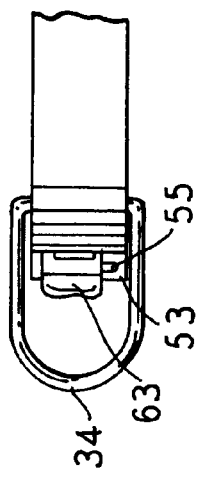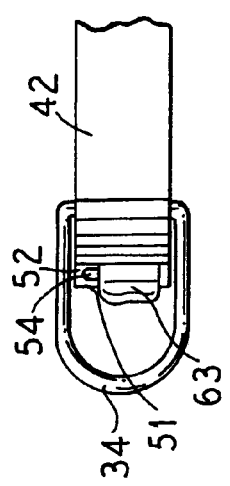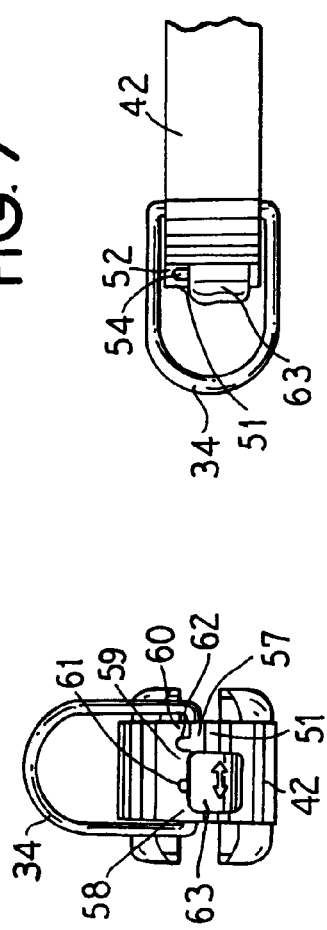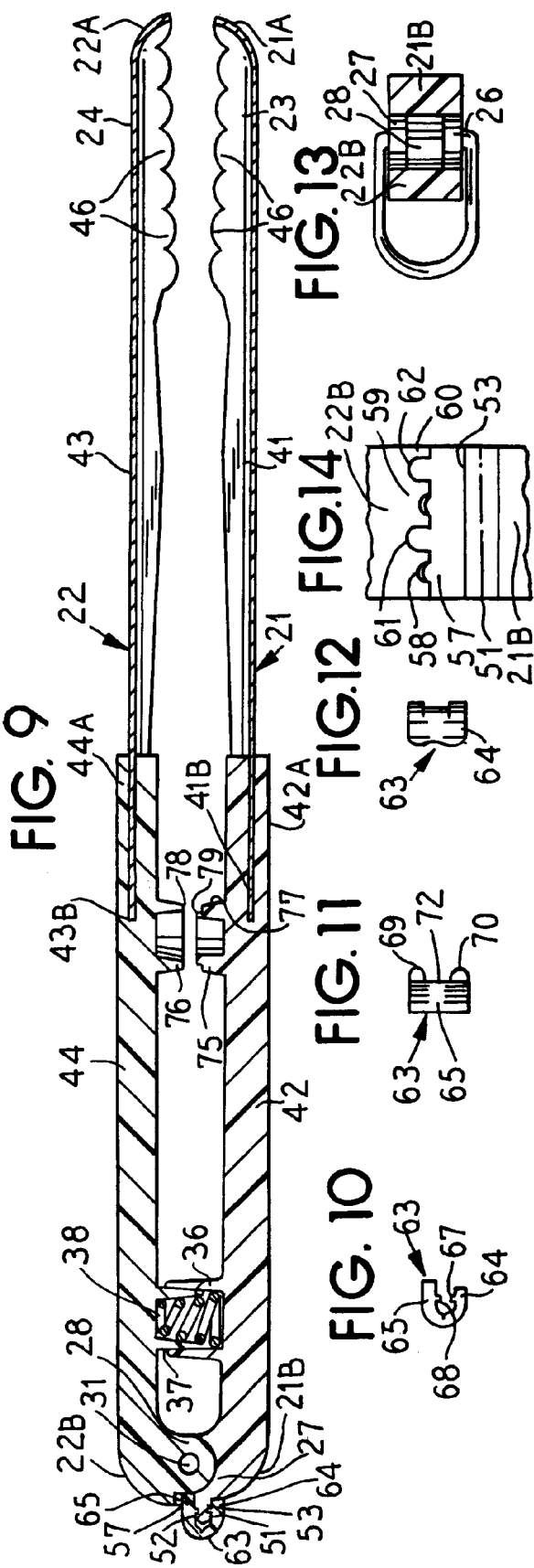

TONGS WITH CLAMP AND STOP MEANS

FIELD OF THE INVENTION

This invention relates to tongs adapted for use barbecuing and the like that are equipped with an arm clamp and arm pivot limiters.

BACKGROUND OF THE INVENTION

Tongs are a basic device for seizing, lifting, or moving objects. Tongs are characterized by having two adjacent long arms. The respective arm front ends function as jaws and pivot between open and closed configurations relative to a hinge-like interconnection existing between the respective arm rear ends in the manner of a class three lever.

The construction, configuration and size of the long arms of a tongs are chosen with regard to the end use intended for the tongs. In the case of tongs intended for use in barbecuing, the arms are relatively long and large so as to permit the user of the tongs to be spaced from the food that is being prepared. Thereby, the user avoids undesirable exposure or contact either with heat radiating from beneath the grill on which the food rests during its cooking, or with hot grease or particles spattering outwardly from the heated grill or food on the grill.

Usually a barbecue tongs is best handled and manipulated by one hand of the user, and usually it is most convenient to have the arms yieldingly biased into an outward, open configuration. Thus, when the hand of the user loosely holds a rearward portion of the tongs, the arms of the tongs maintain themselves in an open configuration, yet, when the user's hand is closed, compressive force is applied against the bias, and the arms close enabling the arm jaws to grasp a chosen item, such as a piece of food or a red hot coal. Hence, the opening and closing of the hand of the user effectuates opening and closing of the forward end portions of the arms. The other hand of the user is typically concurrently used for other tasks associated with barbecuing food.

However, a problem of classic proportions is associated with barbecue tongs: The arms, so biased, can cause the tongs to be unmanageable, or nearly so. Thus, the outward bias provided for the arms does not limit outward movement of the arms so that the arms can fly open to a uselessly wide extent if not continuously gripped by a user's hand, but such a gripping is commonly not practical through an entire barbecuing procedure. Also, the outward bias can severely interfere with practical or convenient storage of the barbecue tongs in a confined location when the tongs are not in active use or are not being grasped.

Further, when arms that are so biased are manually pivoted to a jaws closed configuration, the applied manual compression, or jaws closing, force is hard to control under use conditions. Commonly the applied force is somewhat excessive, causing the members of the jaw pair tend to override one another with the result that one jaw slips laterally relative to the other. This override can result not only in an undesirable stress upon the arms and the hinge like, rear end interconnection between the arms, but also in a shifting, mutilation, or, sometimes, an ejection of an object grasped between the closed jaws tendency so that the object is damaged.

Various means have theretofore been provided for limiting (or stopping) the outward and the inward pivoting extent of arm movement in barbecue tongs having outwardly biased arms, and for locking or clamping the arms in a substantially closed position. Commonly, such prior art stop and/or clamp means may involve an auxiliary member that is separatable from, but associatable, in some way, with the arms, and when so associated, effectuates a desired stop effect or clamp effect. Such an arrangement has disadvantages. For example, the auxiliary member can be cumbersome. When, for instance, the tongs so equipped are in use, the auxiliary member may be separated and easily lost or mislaid.

In prior art tongs, sometimes a stop means can interfere with a clamp means. Also, sometimes, a stop or clamp means may be used in a manner that is injurious to the tongs.

In the art of barbecue tongs, an improved structural arrangement is needed that incorporates integrally both an arm stop means and a non-interfering arm clamp means. Preferably the arm stop means can function limit both the outward and the inward pivoting extent of the arms. Such an improved tongs is provided by the present invention.

SUMMARY OF THE INVENTION

The present invention relates to improved tongs well adapted for use in barbecuing and the like. The tongs arms are outwardly biased and are equipped with clamp means for locking the arms in a substantially closed position and also with stop means for limiting the extent of outward and preferably also inward pivoting movements of the arms. The stop means and the clamp means are integrated into the structure of the tongs yet they do not interfere either with each other or with normal usage of the tongs.

The inventive tongs incorporate a pair of elongated arms that extend in adjacent aligned relationship relative to one another with each arm having a front end portion and an opposed rear end portion. The respective front end portions coact to comprise a pair of jaws that open and close to grasp a selected object.

The respective rear end portions are pivotably associated together and permit the jaws to advance pivotably towards and away from one another relative to the rear end portions.

A spring extends between the arms and is arranged to yieldingly bias the arms into an outward configuration relative to each other.

A reversibly actuatable clamp means is provided for holding when actuated the jaws in a nearly closed configuration.

A first pivot limiting means is provided that is associated with the clamp means and that limits maximum outward movement of the jaws relative to one another.

The clamp means and the first pivot limiting means employ a flange and a U-shaped sleeve that is slidably associated with the flange. The flange and the sleeve are at the rear end of the tongs. In one position along the flange, the sleeve with the arms in a nearly closed configuration holds the arms in a fixed position. In another position along the flange, the sleeve functions to allow the arms to open only to a predetermined extent.

A second pivot limiting means is provided that is associated with the arms and that limits the inward travel of the arms when the jaws are in a substantially closed configuration.

The inventive tongs overcome the above indicated disadvantages of prior art tongs and provide a new and very useful tong structure well suited for barbecuing and the like.

Other and further objects, aims, features, purposes, advantages, functions, embodiments and the like will be apparent to those skilled in the art from the teachings of the present specification taken with the accompanying drawings and the appended claims.

BRIEF DESCRIPTION OF THE DRAWINGS

In the drawings:

FIG. 1 an environmental perspective view of an embodiment of the inventive tongs;

FIG. 2 is an exploded side elevational view of the FIG. 1 tongs;

FIG. 3 is a side elevational view of the FIG. 1 tongs in a closed configuration with the arm closing stops engaged;

FIG. 4 is a side elevational view of the FIG. 1 tongs in a closed configuration with the retaining clamp actuated;

FIG. 5 is a side elevational view of the FIG. 1 tongs in a fully open configuration with the arm opening stops engaged;

FIG. 6 is a rear end elevational view of the FIG. 1 tongs in the FIG. 4 configuration with the retaining clamp actuated;

FIG. 7 is a fragmentary bottom plan view of the rear end region of the FIG. 1 tongs in the FIG. 4 configuration with the retaining clamp actuated;

FIG. 8 is a fragmentary top plan view of the rear end region of the FIG. 1 tongs in the FIG. 4 configuration with the retaining clamp actuated;

FIG. 9 is a longitudinal medial sectional view through the FIG. 4 configuration of the FIG. 1 tongs with the hanging ring removed;

FIG. 10 is a side elevational view of the retaining clamp shown apart from the tongs;

FIG. 11 is a top plan view of the retaining clamp when the FIG. 1 tongs is in the FIG. 4 configuration;

FIG. 12 is a bottom plan view of the retaining clamp when the FIG. 1 tongs is in the FIG. 4 configuration;

FIG. 13 is a vertical sectional view taken approximately along the line XIII—XIII of FIG. 3; and FIG. 14 is a fragmentary rear end elevational view of the FIG. 1 tongs in the FIG. 4 configuration showing the region between the arm rear ends with the U-shaped sleeve removed.

DETAILED DESCRIPTION

Referring to the Figures, there is seen an embodiment 20 of a tongs of the invention, the tongs 20 being well adapted for use in barbecuing and the like. The tongs 20 incorporates a pair of elongated arms 21 and 22 each of which here has a generally straight configuration. Each of the arms 21 and 22 has a proximal or front end portion 21A and 22A and an opposed distal or rear end portion 21B and 22B, respectively.

Those skilled in the art will readily appreciate that the arms 21 and 22 can be variously fabricated. Here, each arm 21 and 22 has a compound structure and is comprised to two sections 41 and 42, and 43 and 44, respectively. The sections 41 and 42, and the sections 43 and 44, are each integrally formed together to define a one-piece arm 21 and 22 structure, respectively.

The forward sections 41 and 43 each extend generally straight and are each preferably comprised of a formed and rigid sheet metal, preferably a stainless steel. The forward end and opposite sides of each section 41 and 43 are down- or in-turned (depending on section orientation) for strength and rigidification purposes. The down-turned opposite sides of each proximal or front end portion 21A and 22A of each section 41 and 43 are provided with a serrated or tooth-like configuration 46, thereby to achieve a jaw member 23 and 24, respectively, that is adapted for grasping and holding. The back or body portion of each front-end portion 21A and 22A is provided with vent slots 48 and 47, respectively.

The rearward sections 42 and 44 each extend generally straight and are each preferably comprised of a unitarily molded plastic that is preferably relatively heat stable and heat resistant, such as a relatively high molecular weight polypropylene, or the like. In the molding, the inner end portion 41B, 43B of each forward section 41 and 43 is embedded in the forward end portion 42A, 44A of each rearward section 42 and 44, respectively, so that the sections 41 and 43 each project forwardly as shown, for example, in FIG. 9. Preferably, and as shown, the general cross-sectional configuration along each section 42 and 44 is rectangular, but exceptions occur (a) in the forward end region 42A, 44A of each section 42 and 44, where opposite edge portions are each preferably outwardly flared (as shown, for example, in FIG. 9) to retard forward movement or placement of a user's hand, and (b) in the rear end or distal regions 42B and 44B, respectively, where inner opposed side portions of each section 42 and 44 are transversely (relatively to tongs 20) thickened (as shown, for example, in FIG. 2) to provide hinge leaf members as below described. Also, in two medially spaced inner side regions, each section 42 and 44 is provided with projections as below described.

To enable the jaw members 23 and 24 to coact as a pair of jaws and to pivot between open and closed positions for object grasping and releasing, the respective rear end portions 21B and 22B are pivotably interconnected. For such an interconnection, the respective rear end portions 21B and 22B are each terminally configured to achieve a pivotal or hinged association therebetween. Those skilled in the art will appreciate that various arrangements can be utilized. In general, each arm rear end portion 21B and 22B has at least one terminally located hinge leaf member. Various hinge leaf member arrangements can be employed. In embodiment 20, the rear end portion 21B is provided at each of its lateral opposite sides with an upstanding, symmetrically configured (relative to each other) leaf 26 and 27 (see, for example, FIG. 2 or FIG. 13). Each leaf 26 and 27 effectively upstands transversely from the associated rear end portion 21B, and each leaf 26 and 27 has a generally hemi-circular exposed perimeter configuration.

The rear end portion 22B is provided in a mid-region thereof between each of its lateral opposite sides with a single, upstanding leaf 28 which effectively upstands transversely from the associated rear end portion 22B. The exposed perimeter surface portions of leaf 28 have a generally hemi-cylindrical configuration.

The relationship between the leaves 26 and 27 and the leaf 28, and the configuration of the rear end portions 21B and 22B, is such that the leaf 28 is nestably received between the leaves 26 and 27 in adjacent relationship. A central aperture 29 is defined in each leaf 26 and 27. Aperture 29 is coaxial with a central aperture 31 that is defined in leaf 28. After the rear end portions 21B and 22B are engaged with one another and the apertures 29 and 31 are aligned, a pintle 32 (see FIG. 2, for example) is extended through the aligned apertures 29 and 31, thereby defining a hinge structure 33 wherein the leaf 28 opposite side faces are oppositely pivotable relative to the adjacent respective side faces of the leaves 26 and 27. Pivoting of hinge 33 occurs about a pivot axis (not detailed) that extends normally relative to the arms 21 and 22 and that coincides generally with the center of the pintle 32. The hinge structure 33 permits the jaw members 23 and 24 to advance either towards or away from one another relative to the hinge structure 33. The leaves 26, 28 and 27 are configured so that, when the jaw members 23 and 24 are in a fully closed configuration, edge portions thereof meet and the arms 21 and 22 have advanced to an orientation that is slightly beyond a generally spaced, parallel relationship therebetween (see, for example, FIG. 3).

The pintle 32 can have various structures, but is preferably has a hollow rivet type structure and is conveniently comprised of a swagable metal, such as brass, or nickel coated brass. After assembly with the leaves 26, 28 and 27, the opposite ends of the rivet structure can be flared outwardly by swaging or the like, as those skilled in the art will appreciate, thereby permanently connecting the leaves 26, 28 and 27 together in the desired pivotal relationship with the pintle 32. Thereafter, each opposite in-turned end portion of a loop or ring 34 of material, preferably steel, is inserted into a different respective end of the pintle 32, thereby providing a convenient support means for hanging the tongs 20 from a hook or the like (not shown).

To achieve a yielding outward biasing of the jaw members 23 and 24 relative to each other, a spring member is utilized which exerts an outward biasing force against the arms 21 and 22. Those skilled in the art will readily appreciate that various springs and spring arrangements can be employed. In embodiment 20, the inner surface of each section 42 and 44 is provided with a cylindrical, or preferably slightly conically outwardly decliningly tapered, housing 36 and 37, respectively. The housings 36 and 37 are located in adjacent but spaced relationship to hinge 33 and the housings 36 and 37 are positioned in a transversely aligned, opposed relationship relative to each other. Housing 37 is configured to move longitudinally, but arcuately and in non-contacting relationship, within housing 36 in the assembled tongs 20 during pivotal movements of the arms 21 and 22 (see FIG. 5, for example).

As shown, for example, in FIG. 9, a cylindrically or preferably (as shown) slightly conically tapered coiled spring 38 is axially positioned within the housings 36 and 37 during assembly of the tongs 20. Respective opposite end portions of the spring 38 thus each engage and exert an outward yielding bias upon the surface area located at the base of each housing 36 and 37. That surface area in each base comprises a portion of a different respective one of the arms 21 and 22.

The tongs 20 includes a reversibly actuatable clamp means that, when actuated by a user, is adapted for holding, or, in effect, locking together, the respective jaw members 23 and 24 in a nearly closed configuration, such as illustrated for example in FIG. 4, where the arms 21 and 22 are approximately in a spaced, parallel relationship. The clamp means utilizes a flange 51 that is integrally formed with section 42 and that rearwardly projects from the rear end portion 21B of the section 42 of the arm 21. The flange 51 extends laterally across the section 42 and has opposed opposite side faces 52 and 53 that are each provided with a medially located and longitudinally (relative to the flange 51) extending groove 54 and 55, respectively (see, for example, FIGS. 7 and 8). The flange 51 is located adjacent to the base of the leaves 26 and 27 where they join the body of the rear end region 21B.

In the assembled tongs 20, the laterally extending terminal edge of the rear end portion 22B is configured to be discontinuous and is defined by equal projecting regions (or projections) 58, 59 and 60 between which are interdigitated open slots 61 and 62, respectively (see, for example, FIG. 6). As a consequence, when the arms 21 and 22 are in the configuration shown, for example, in FIG. 4, a straight, laterally (relative to the arms 21 and 22) extending slotted recess 57 is generally defined between (a) the projecting regions 58, 59 and 60 along the terminal edge of the rear end portion 22B and (b) the adjacent side face 53 of the flange 51. Relative to the flange 51, the arrangement is preferably and as shown such that the side face 52 of the flange 51 has a greater cross width (taken longitudinally along the tongs 20) than the opposite side face 53, thereby permitting the rear end region 21B to be molded over a base portion of the side face 53 so as to better support the side face 52.

The clamp means also utilizes a flattened, generally U-shaped sleeve 63 that has a broad width and that has opposed respective sides defined by flattened leg members 64 and 65 with leg member 65 being longer and somewhat thicker than leg member 64. The U-shaped sleeve 63 is conveniently comprised of molded plastic; the plastic can, for example, be like that used in sections 42 and 44. The U-shaped sleeve 63 mounts over the flange 51 with each leg member 64 and 65 slidably engaging and being moveable along a different respective side face 52 and 53. On an inside opposed surface portions of each leg member 64 and 65, a raised shoulder 67 and 68, respectively, is provided (see FIG. 10, for example). Each shoulder 67 and 68 is configured to engage a groove 54 and 55, respectively.

The terminal outer end edge region of leg member 65 of U-shaped sleeve 63 is discontinuous and is defined by a pair of projecting portions 69 and 70. Each projecting portion 69 and 70 is located adjacent to a different lateral opposite side edge of the leg member 65. Between the projecting portions 69 and 70 along the end edge region of leg member 65 is an open slot 72 (see, for example, FIG. 11). When the arms 21 and 22 are in the configuration shown, for example, in FIG. 4, and the position of the U-shaped sleeve 63 along the flange 51 is such that (a) the projecting portions 69 and 70 are located in and occupy portions of the slotted recess 57 while concurrently (b) each of the projecting regions 58 and 59 is aligned with a projecting portion 69 and 70, respectively, then the arms 21 and 22 are retained in a substantially closed or locked configuration. This locked configuration consequentially results when the projecting portions 58 and 59 of the rear end portion 22B are brought pivotally into contact with the projecting portions 69 and 70, respectively, by reason of the spring 38 bias urging the hinge 33 into an open configuration, so that the arms 21 and 22 are prevented from pivoting outwardly relative to each other.

When the arms 21 and 22 are in the maximum open configuration illustrated in FIG. 5, the position of the U-shaped sleeve 63 along the flange 51 is such that the projecting portions 69 and 70 are aligned with, and occupy, the slots 61 and 62 while concurrently the projecting region 59 occupies the slot 72. The projection 60 is located adjacent to one side of the U-shaped sleeve member 63 and the projection 58 is located adjacent to the opposite side of the U-shaped sleeve member 63. Thus, the arms 21 and 22 pivot outwardly relative to one another by reason of the spring 38 bias urging the hinge 33 into the open configuration shown in FIG. 5 where the projections 58, 59 and 60 reach and abut against portions of the side face 52, thereby preventing further outward pivoting of the arms 21 and 22 and limiting the extent of outward pivoting of the arms 21 and 22.

Thus, either one of two positions may be selected by a user for the U-shaped sleeve member 63 along the flange 51. In one position, the U-shaped sleeve member 63 functions to lock or hold the arms 21 and 22 in a fixed position where the jaws 23 and 24 are almost in a closed position. In the second position, the U-shaped sleeve member 63 functions to limit or stop outward pivoting movement of the arms 21 and 22.

Another or second pivot limiting means is associated with the arms 21 and 22 to limit further inward movement of said arms once the jaw members 23 and 24 are in a predetermined substantially fully closed configuration, such as shown, for example, in FIG. 3. This second pivot limiting means utilizes a pedestal 75 and a pedestal 76, each medially located on a section 42 and 44, respectively, of each arm 21 and 22. Each pedestal 75 and 76 has an outer or terminal facial portion 77 and 78, respectively, that is adapted to abuttingly engage with the other such portion. Each pedestal 75 and 76 is in transversely (relative to tongs 20) aligned relationship with the other. Thus, when the jaw members 23 and 24 are pivoted to a substantially fully closed configuration, the respective outer facial portions 77 and 78 of each pedestal 75 and 76 engage, thereby limiting further pivotal closing of the jaw members 23 and 24.

To limit lateral movement of the jaw members 23 and 24 relative to one another when the arms 21 and 22 are in a fully closed position such as illustrated in FIG. 3, each pedestal 75 and 76 is provided with a hollow or tube like configuration. One pedestal, here pedestal 75, has a circumferentially extending, upstanding shoulder 79 on its facial portion 77. The shoulder 79 is located in radially inwardly spaced relationship relative to outer edge regions of facial portion 77. The facial portion 78 of the other pedestal 76 is configured to engage matingly with, and fit over, the facial portion 77. When the facial portions abut and engage the shoulder 79 prevents the pedestal 75 from moving laterally, thereby avoiding lateral slipping action of one jaw member 23 relative to the other member 24.

It will be understood that the invention is not limited to the particular structure and components shown and described, and that changes and adaptations are contemplated which readily and fairly fall within the spirit and scope of the invention as set forth and determined by the appended claims.

What is claimed is:

1. Tongs for use in barbecuing and the like comprising in combination:

a pair of elongated arms, one arm extending in adjacent, aligned relationship relative to the other, each arm having a front end portion and an opposed rear end portion;

said respective front end portions coacting to comprise a pair of jaws that open and close to grasp a selected object;

said respective rear end portions being pivotably associated together whereby said jaws can advance pivotably towards and away from one another relative to said rear end portions;

a spring extending between said arms and yieldingly biasing said arms into an outward configuration relative to each other;

a reversibly actuatable clamp means for holding when actuated said respective jaws in a nearly closed configuration, the clamp means comprising:

a flange with opposed side faces, said flange rearwardly projecting from said rear end portion of one said arm, and said flange extending along and adjacent to said respective rear end portions, a U-shaped sleeve having opposed respective leg members, said sleeve slidably extending over said flange with each said leg member slidably engaging a different one of said side faces, and a terminal portion of one said leg member extending into a channel defined between one side face of said flange and said rear end portion of said other arm, said terminal portion being slidably moveable in said channel when said sleeve slidably moves over said flange;

first pivot limiting means associated with said clamp means for limiting maximum outward movement of said jaws relative to one another; and second pivot limiting means associated with said arms limiting further inward movement of said arms when said jaws are in a substantially fully closed configuration.

2. The tongs of claim 1, wherein said first pivot limiting means is provided by a cooperative association between said one leg member terminal portion and said rear end portion of said other arm so that:

when said sleeve is in a first position along said flange, and said respective jaws are in said nearly closed configuration, said rear end portion of said other arm abuts against said one leg terminal portion and said arms are in a clamped together configuration, and when said sleeve is in a second position along said flange, and said jaws are pivotable relative to one another, and when said jaws are in a prechosen maximum outwardly divergent configuration, said rear end portion of said other arm abuts against said flange and said jaws diverge only to said maximum divergent configuration.

3. The tongs of claim 1 wherein said second pivot limiting means comprises a pedestal medially located on each said arm, each pedestal having an outer facial portion adapted to abuttingly engage with the other, and each pedestal being in aligned relationship with the other, so that, when said jaws are pivoted to a substantially fully closed configuration, said respective outer facial portions of each pedestal engage, thereby limiting further pivotal closing of said jaws.

4. Tongs for use in barbecuing and the like having tong clamp means and tong pivoting means, said tongs comprising in combination:

a pair of elongated arms, one arm extending in adjacent, aligned relationship relative to the other, each arm having a front end portion and an opposed rear end portion;

said respective front end portions coacting to comprise a pair of jaws that open and close to grasp a selected object;

said respective rear end portions each having at least one terminal hinge leaf portion, said hinge leaf portions of both arms coacting with one another so that adjacent leaf portion side faces of each respective rear end portion are oppositely pivotable relative to one another about an axis the extends generally normally to said arms whereby said jaws can advance pivotably towards and away from one another relative to said hinge leaf portion;

a pintle that extends along said axis and that interconnects said hinge leaf portions;

a spring extending between said arms and yieldingly biasing said arms into an outward configuration relative to each other;

a reversibly actuatable clamp means for holding when actuated said respective jaws in a nearly closed configuration, said clamp means comprising:

a flange with opposed side faces, said flange rearwardly projecting from said rear end portion of one said arm, and said flange extending along and adjacent to said hinge leaf portions, a U-shaped sleeve having opposed respective leg members, said sleeve slidably extending over said flange with each said leg member slidably engaging a different one of said side faces, a terminal portion of one said leg member extending into a channel defined between one side face of said flange and said rear end portion of said other arm, said terminal portion being slidably moveable in said channel when said sleeve slidably moves over said flange;

said one leg member terminal portion and said rear end portion of said other arm cooperating with each other so that when said sleeve is in a first position along said flange, and said respective jaws are in said nearly closed configuration, said rear end portion of said other arm abuts against said one leg member terminal portion and said arms are in a clamped together configuration, and when said sleeve is in a second position along said flange, and said jaws are pivotable relative to one another, and when said jaws are in a prechosen maximum outwardly divergent configuration, said rear end portion of said other arm abuts against said flange and said jaws diverge only to said maximum divergent configuration; and a pedestal medially located on each said arm, each pedestal having an outer facial portion configured to abuttingly engage with the other, and each pedestal being in aligned relationship with the other, so that, when said jaws are pivotably advanced to a substantially fully closed configuration, said respective outer facial portions of each pedestal engage, thereby limiting further pivotal closing of said jaws.

5. The tongs of claim 4 wherein each said arm is comprised to two sections, one section of which distally terminates in one said jaw, and the other section of which proximally terminates in said leaf portion, and said two sections engage in a mid-region of each arm.

6. The tongs of claim 5 where, in each said arm, said one section is comprised of metal, and said other section is comprised of plastic, and wherein said pedestals, said sleeve, said flange, and said spring are all located in said other section.

7. The tongs of claim 4 wherein said pintle is tubular and wherein each opposite end portion of a rigid hanging loop is nestably and pivotably received in a different opposite end portion of said pintle.

8. The tongs of claim 4 wherein said spring is contained within a pair of nestably associated cylindrical members, each cylindrical member being associated with, and upstanding from, a different one of said arm members, and each said cylindrical members being generally coaxially aligned with the other thereof whereby, during pivotal movements of said arms, an inner one of said cylindrical members arcuately moves relatively to an outer one of said cylindrical members.

9. The tongs of claim 4 where each said pedestal is hollow, one said pedestal has a circumferentially extending, upstanding shoulder on said facial portion thereof and said shoulder is located in radially inwardly spaced relationship relative to outer edge portions thereof, and said facial portion of the other pedestal is configured to engage matingly with said facial portion and said shoulder of said one pedestal.

* * * * *